United States Patent
Forrest, Jr.

(10) Patent No.: US 9,910,227 B2
(45) Date of Patent: Mar. 6, 2018

(54) OSCILLATING FIBER OPTIC CLEANING TOOL

(71) Applicant: Illinois Tool Works Inc., Glenview, IL (US)

(72) Inventor: Edward J. Forrest, Jr., Marietta, GA (US)

(73) Assignee: ILLINOIS TOOL WORKS INC., Glenview, IL (US)

( * ) Notice: Subject to any disclaimer, the term of this patent is extended or adjusted under 35 U.S.C. 154(b) by 137 days.

(21) Appl. No.: 14/931,130

(22) Filed: Nov. 3, 2015

(65) Prior Publication Data

US 2016/0170153 A1 Jun. 16, 2016

Related U.S. Application Data

(60) Provisional application No. 62/090,638, filed on Dec. 11, 2014.

(51) Int. Cl.
| | |
|---|---|
| *B08B 13/00* | (2006.01) |
| *G02B 6/38* | (2006.01) |
| *B08B 1/00* | (2006.01) |
| *B08B 7/02* | (2006.01) |

(52) U.S. Cl.
CPC .............. *G02B 6/3866* (2013.01); *B08B 1/00* (2013.01); *B08B 1/003* (2013.01); *B08B 7/02* (2013.01); *B08B 13/00* (2013.01); *G02B 6/3807* (2013.01)

(58) Field of Classification Search
CPC ............................... B08B 13/00; G02B 6/3866
See application file for complete search history.

(56) References Cited

U.S. PATENT DOCUMENTS

| | | | |
|---|---|---|---|
| 6,393,651 B1 | 5/2002 | Forrest, Jr. et al. | |
| 6,449,795 B1 * | 9/2002 | Sato .......................... | B08B 1/00 15/209.1 |
| 6,523,908 B2 | 2/2003 | Forrest, Jr. et al. | |
| 6,681,663 B1 | 1/2004 | Hsien | |
| 6,758,605 B1 | 7/2004 | Villemaire et al. | |
| 6,769,150 B1 | 8/2004 | Liu et al. | |
| 6,795,998 B1 | 9/2004 | Kammerer et al. | |
| 7,526,830 B2 | 5/2009 | Forrest et al. | |
| 7,552,500 B2 | 6/2009 | Forrest, Jr. | |
| 8,336,149 B2 | 12/2012 | Blair et al. | |

(Continued)

FOREIGN PATENT DOCUMENTS

| | | |
|---|---|---|
| EP | 1681588 A2 | 7/2006 |
| GB | 2 457 928 A * | 9/2009 |

OTHER PUBLICATIONS

International Search Report issued by ISA/EPO in connection with PCT/US2015/064037 dated Mar. 4, 2016.

*Primary Examiner* — Randall Chin

(74) *Attorney, Agent, or Firm* — Levenfeld Pearlstein, LLC

(57) ABSTRACT

A fiber optic component cleaning device includes a body, a motor mounted in the body and a power supply mounted in the body and operably connected to the motor. The device has a resilient platen mounted to the body and a cleaning material configured to reside on the platen. An oscillating device is operably mounted to the motor to induce an oscillation in the body and the platen to oscillate the platen with the cleaning material thereon. The tool is configured to clean surfaces of the fiber optic component by oscillating movement of the platen and the cleaning material on the platen.

11 Claims, 4 Drawing Sheets

(56) References Cited

U.S. PATENT DOCUMENTS

| | | | |
|---|---|---|---|
| 8,402,587 B2* | 3/2013 | Sugita | G02B 6/3807 15/210.1 |
| 8,429,784 B2 | 4/2013 | Forrest, Jr. et al. | |
| 2010/0178856 A1 | 7/2010 | Cruz | |
| 2014/0144468 A1* | 5/2014 | Nakane | B08B 1/006 134/6 |
| 2015/0285708 A1 | 10/2015 | Forrest, Jr. | |

* cited by examiner

OSCILLATING FIBER OPTIC CLEANING TOOL

CROSS-REFERENCE TO RELATED APPLICATION DATA

This application claims the benefit of and priority to U.S. Provisional Patent Application Ser. No. 62/090,638, filed Dec. 11, 2014, the disclosure of which is incorporated herein in its entirety.

BACKGROUND

Communication systems and platforms are often combinations of copper, wireless and fiber optic media. Transmission rates and capacities have increased and are now measured in gigabytes and terabytes per second to a contemporary standard of ten gigabytes per second. Research continues to move transmission rates toward petabytes and beyond.

In order to achieve, maintain, and even surpass these transmission rates, transmission media and in particular fiber optic conductors must be fabricated and maintained to exacting standards and tolerances. This is particularly so in the fabrication, manufacture, installation, maintenance and testing of fiber optic component end faces. These end faces frequently become contaminated with dirt, dust, oil, grease, and other debris. Contamination, dry, fluidic and combinations thereof can have a significant impact on the quality (e.g., speed and integrity) of transmission across fiber optic networks. As such, cleaning the fiber optic connectors preserves the quality of these very high-speed transmissions. Various types of fiber optic connectors are known. Some of these connectors permit the joining of single optical fibers. Other types of connectors more efficiently permit the joining or connecting of multiple fibers in a single physical connector body. The various types of connectors as such have differing physical structures, connector configurations, components and the like. These include direct contact and expanded beam types.

Improper cleaning can result in the reflectance of the fiber optic transmission (signal), in which the signal is sent back along the transmission path. Improper cleaning can also leave a residue that, improperly characterized as non-removable, can create a stand-off between mated connection to results in signal loss. Improper cleaning can also refract the signal and create losses at the connector which may be multiplied many times over the course of an installation.

Numerous devices are available for cleaning fiber optic end faces. For example, Forrest, U.S. Pat. Nos. 8,429,784, 8,336,149 and 7,552,500, which patents are commonly assigned with the present application and are incorporated herein in their entirety, disclose various devices for cleaning fiber optic connectors. These devices function well to clean many of the surfaces and areas of fiber optic connectors, however, due to their larger size may not be as effective for cleaning more difficult to access areas of the connectors.

Other devices, such as the swabs disclosed in Forrest, U.S. Pat. Nos. 7,526,830, 6,523,908 and 6,393,651, and Kammerer, U.S. Pat. No. 6,795,998, also function well as devices for cleaning fiber optic connectors. However, because these devices require manually moving the swab to remove contamination, they may not be usable to facilitate cleaning all areas of the connectors.

Accordingly, there is a need for a fiber optic cleaning device that can be used to effectively clean all areas of fiber optic connector end faces. Desirably, such a device is portable, allowing it to be used in the field, and provides a high degree of and reliability that connector end faces have been cleaned to specification.

SUMMARY

A fiber optic component cleaning device has a body, a motor mounted in the body and a power supply mounted in the body and operably connected to the motor. A resilient platen is mounted to the body and a cleaning material is configured to reside on the platen. An oscillating device is operably mounted to the motor to induce an oscillation in the body and the platen to oscillate the platen with the cleaning material thereon. The tool is configured to clean surfaces of the fiber optic component by oscillating movement of the platen and the cleaning material on the platen. Oscillation can reduce the time needed to clean the component and the amount of cleaning material required.

In an embodiment, an eccentric element is mounted to the motor, wherein the motor rotates the eccentric element to oscillate the platen. The device can be configured to oscillate in a range of about 5,000 to 40,000 oscillations per minute.

The cleaning material can be an elongated strip, such as a cleaning tape. The device can include an advancing mechanism for advancing the cleaning material along the platen. In an embodiment, feed and take-up spools feed fresh cleaning material and take-up used cleaning material. One or both of the feed and take-up spools can be configured for one-way movement to prevent cleaning material re-use. The take-up spool can be manually or automatically advanced.

The power supply can be a battery that is located in the body. Such an embodiment provides a portable, light-weight and easy to use tool.

The device can include a swab holder configured to secure a swab to the cleaning device. The swab holder can be configured to oscillate the swab. The device can also be used to clean back plane connections and other components such as the alignment sleeve.

A light can be provided on the device. The light can be, for example, an LED powered by the battery.

BRIEF DESCRIPTION OF THE DRAWINGS

The benefits and advantages of the present disclosure will become more readily apparent to those of ordinary skill in the relevant art after reviewing the following detailed description and accompanying drawings and photographs, wherein:

FIGS. 1 and 1A are illustrations of one example of a fiber optic connector that can be cleaned with an embodiment of an oscillating fiber optic cleaning device, the illustrations further showing the various zones of the connector, and in which FIG. 1A shows the use of a swab tool for cleaning various components of a fiber optic connector;

DETAILED DESCRIPTION

Figure 1:
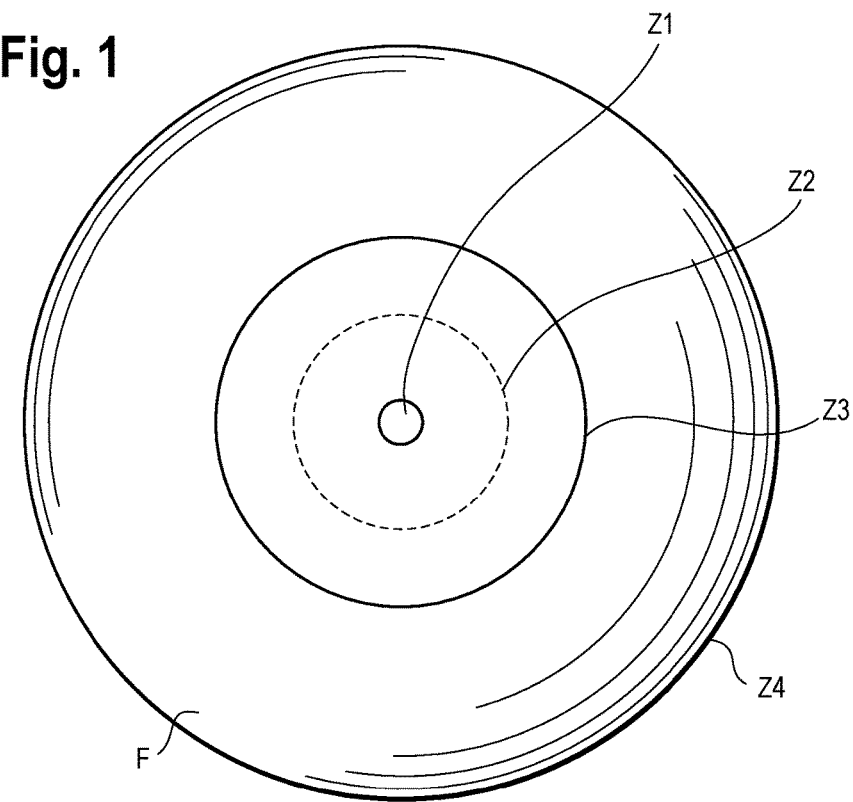

While the present invention is susceptible of embodiment in various forms, there is shown in the drawings and will hereinafter be described a presently preferred embodiment with the understanding that the present disclosure is to be considered an exemplification of the invention and is not intended to limit the invention to the specific embodiment, size or shape illustrated.

Figure 4A:
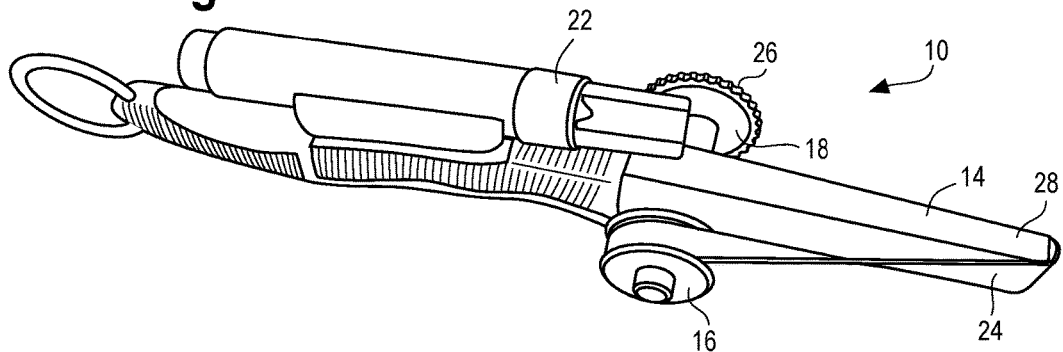
FIGS. 4A-4C are various views of an embodiment of the oscillating fiber optic cleaning device.
Figure 4B:
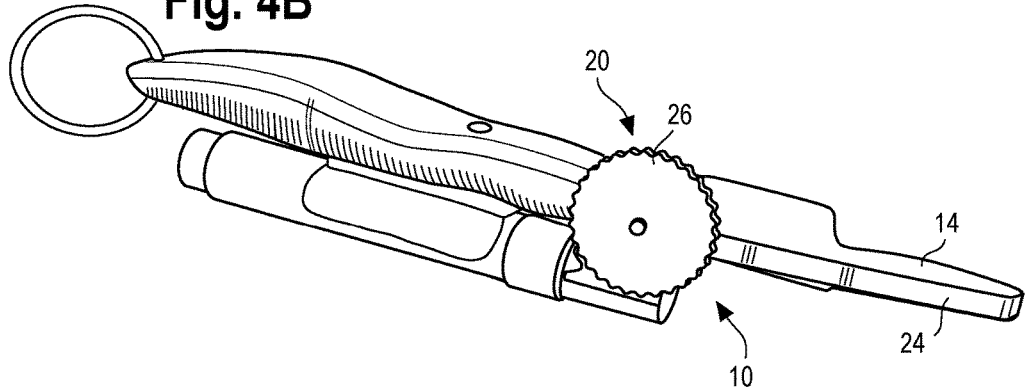
Figure 4C:
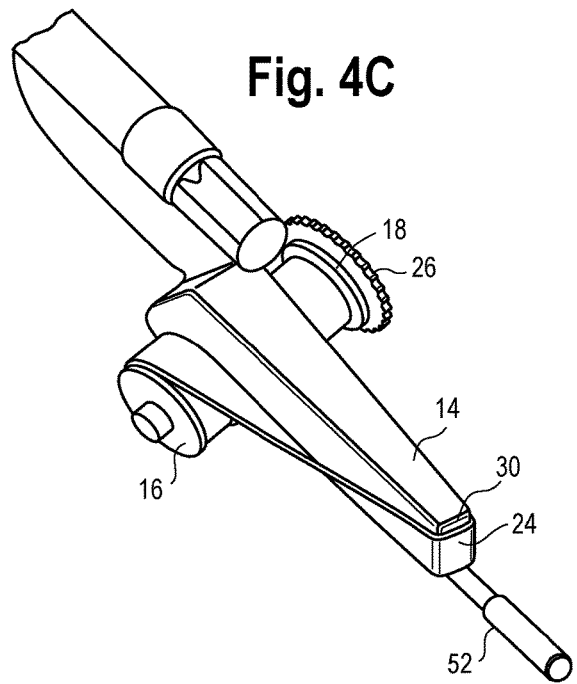
Figure 5A:
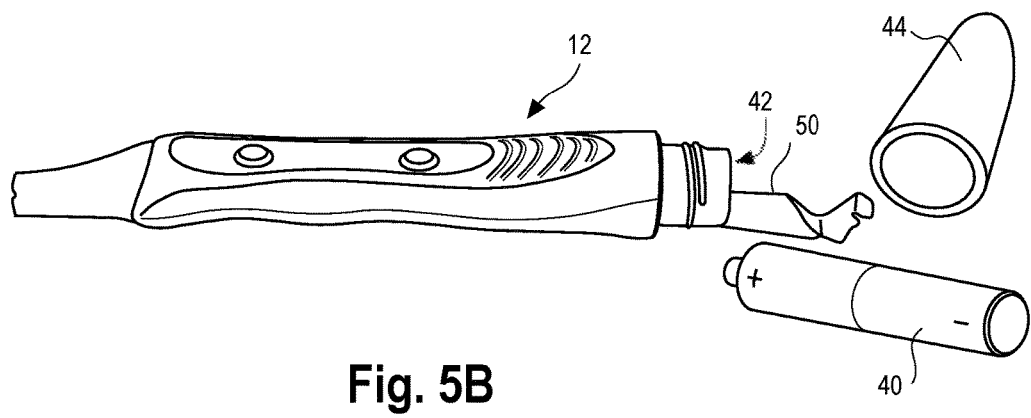
FIGS. 5A-5D are various views showing the construction of an embodiment of the oscillating fiber optic cleaning device.
Figure 5B:
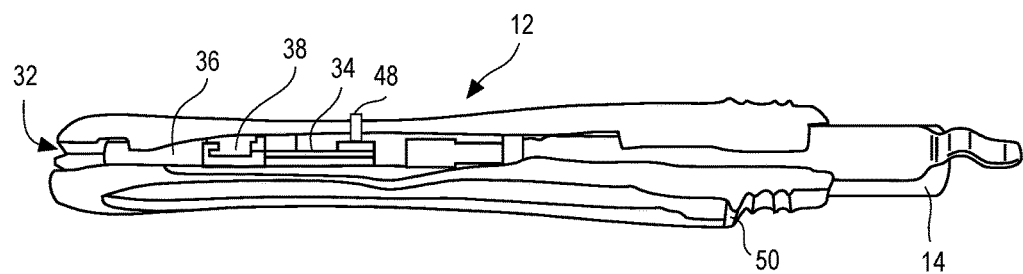
Figure 5C:
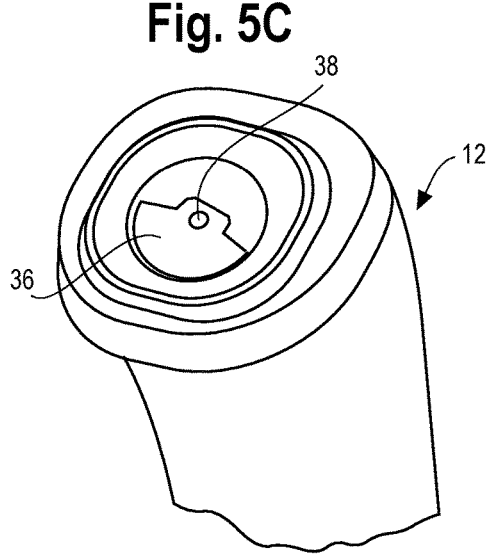
Figure 5D:
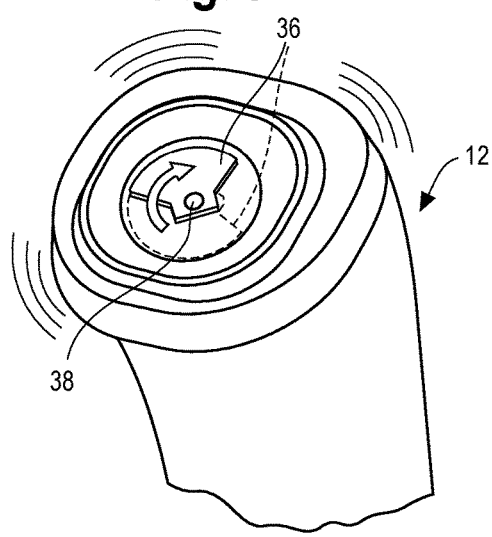

Referring to FIGS. 2, 4A-4C and 5A-5D, there is shown an oscillating fiber optic cleaning tool 10. The tool 10 includes generally, a body 12, a cleaning platen 14, a feed spool 16, a take-up spool 18, and an advancing assembly 20. Optionally, the tool 10 can include a liquid cleaner dispenser 22. A cleaning tape 24 is wound onto the feed spool 16, feeds across the platen 14 and is wound onto the take-up spool 18. The feed and take-up spools 16, 18 can be configured so that the tape 24 moves in one direction—from the feed spool 16 to the take-up spool 18 (as indicated by the arrow at 19) and is prevented from moving backward, that is, from the take-up spool 18 to the feed spool 16. One way movement of the tape 24 can be carried out by, for example, a ratchet arrangement, a gear portion 26 of which is illustrated in FIGS. 4B and 4C. The gear portion 26, which is shown mounted to or formed as part of the take-up spool 18, can also be used as a drive for moving the tape 24 along the platen 14 by, for example, a user rotating the spool 18 by urging a finger along the gear 26 teeth. Guides 28 can be located on sides of the platen 14 to guide the tape 24 along the front or head 30 of the platen 14. It will be appreciated that the platen 14 and tape 24 provide a relatively large cleaning area for the tool 10; relative in the sense that the fiber optic device and the area to be cleaned are small.

In an embodiment, the platen 14 is formed from a relatively soft or pliant material. This provides a resilient cleaning surface so that the tool head (platen head 30) can be pressed against a surface, such as a surface of the connector and, where needed, conform to the connector surface for increased contact with the surface. In an embodiment, the platen 14 is formed from a soft or pliant, relatively liquid impermeable material so that it does not absorb liquids such as water or other cleaning liquids, e.g., solvents, that may be used in the cleaning process. Platen 14 materials can be, for example, non-linting materials, such as a tight, closed cell material, or a covered open cell matrix. A soft platen 14 is preferred in that it provides a measure of cushioning in the event that hard or coarse debris is present which could, if pressed too hard, scratch or be ground into the area. The soft or pliable material compensates for UPC and APC end face geometries. One suitable material is neoprene. Other suitable materials will be recognized by those skilled in the art.

The tool 10 includes an oscillating movement provided by an oscillating assembly 32 that induces an oscillating movement to the platen 14. In an embodiment, the oscillating assembly includes a motor 34 positioned in the tool body 12. The oscillating movement can be provided by an eccentric element 36 positioned on an output shaft 38 of the motor 34. In this manner as the motor 34 actuates (rotates), the eccentric element 36 provides a minor imbalance on the output shaft 38 to create the oscillating movement. A power supply, such as a battery 40, can also be located within the body 12. In an embodiment, the battery 40 is located in a battery compartment 42 adjacent to the motor 34, and is accessible from a removable end 44 of the body 12. A switch 48 permits turning the tool 10 on and off. The device may have manual advance of the cleaning tape 24 and motor 34 induced oscillation.

The oscillating movement provided by the eccentric 36 on the output shaft 38 of the motor 34 effectively scrubs contamination from the connector without the need for excessive manual scrubbing action. That is, the oscillating movement provides enough movement of the platen 14 to remove contamination such that a manual scrubbing action, or back-and-forth movement of the tool 10 is minimally if at all needed.

It has been found that oscillating movement in the general range of about 5,000 to 40,000 oscillations per minute functions well to achieve the cleanliness desired for the connectors. And, while movement in the ultrasound range (e.g., greater than about 20 kHz) may function as well, it is not necessarily required for proper fiber optic component cleaning This is especially so when the device is used in connection with a solvent/cleaning source.

A illuminating element, such as an LED or other lower power lighting device 50 can be incorporated into the cleaning tool 10 to facilitate illuminating and viewing the areas to be cleaned.

Figure 1A:
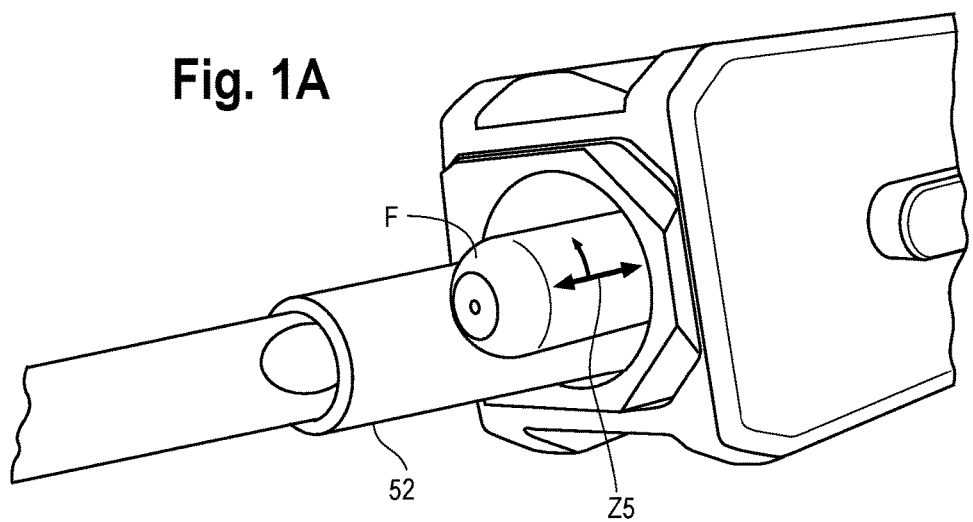
Figure 2:
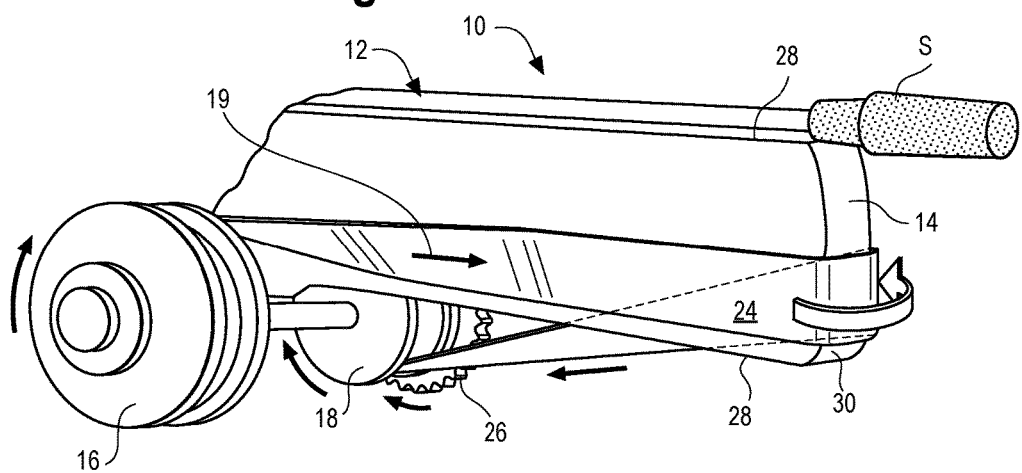
FIG. 2 is an illustration of one embodiment of a an oscillating fiber optic cleaning device.
Figure 3:
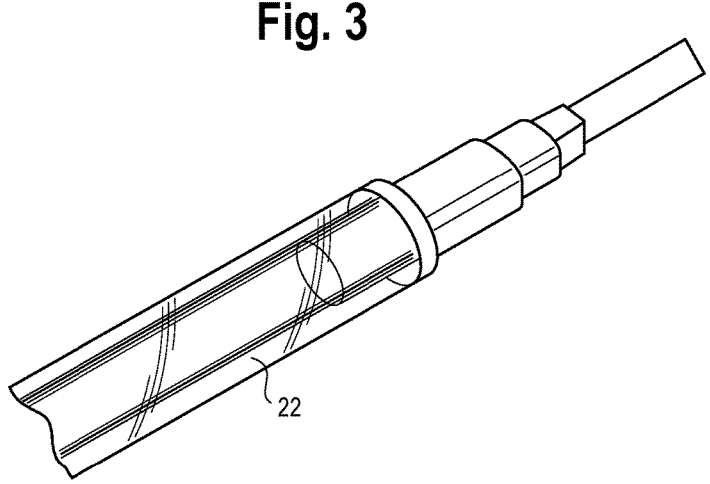
FIG. 3 illustrates one liquid cleaner (solvent) supply device for use with the oscillating cleaner.

Referring to FIGS. 1 and 1A there is shown a fiber optic end face with Zones 1-5 defined about the ferrule. For purposes of the present disclosure, Zones 1-4 are defined along the horizontal end face of the connector in an x-y plane. Zone 1 (Z1) is typically defined as the center or core of the connector—it is the fiber core. Zone 2 (Z2) is defined as the region extending from the core to and including the cladding or reflective surface of the fiber. In typically known fiber optic systems Zone 2 typically extends about 125 µm from the center of the fiber or core. Zone 3 (Z3) is defined as the area that extends about 250-300 µm from the center of the fiber or the core, per International Electrotechnical Commission (IEC) standards, and is the area commonly seen by contemporary video inspection. Further identification of Zone 4 (Z4), which is defined as the region across the end of the ferrule (in the x-and y-directions), encompassing the entirety of the face in the x-y directions), and Zone 5 (Z5) which is defined as the region starting at the outer edge of the horizontal ferrule and extending along the length of the vertical ferrule (in the z-direction) are also made, forming a three-dimensional structure (not only the two-dimensional strucutre as noted in the IEC standards.

The present oscillating fiber optic cleaning tool 10 provides enhanced cleaning of the complete end face F, Zone 1-4, as well as the potential for removal of contamination from Zone 5, of the fiber optic surface with a vibrational or oscillating movement that is designed to remove the widest range of debris and contamination. The vibrational or oscillating platen 14, in conjunction with the precision wiping material 24 facilitates exceptional cleaning The oscillating surface can be used with known fiber optic precision cleaning fluids, such as those commercially available from ITW Chemtronics of Kennesaw, Ga.

Although a roll-form cleaning tape 24 is disclosed and described those skilled in the art will appreciate that a Z-fold perforated material that can also be used and automatically (or manually) advanced for each cleaning operation. In addition, advancing the cleaning tape 24 can be done manually, as described above, or the tool 10 can be configured to operate in a powered manner, or both.

The present fiber optic cleaning tool 10 provides enhanced fiber optic connector and end face cleaning in a small convenient device that, in addition to cleaning the end face and/or connector, can also be used to dry the fiber optic end face or connector. The present disclosure provides for the cleaning of, generally described fiber optic end faces and connectors, and it is anticipated that the device can be used on many types of fiber optic components including, but not limited to fiber optic components such as SC APC and UPC, LC APC and UPC, MT® APC and UPC, Corning® Opti- Fit®, H+S e2000, and others. The tool 10 can be used to clean both jumper side and backplane side fiber optic end face surfaces and alignment sleeves.

The tool 10 may also be configured with a holder 52 for a swab S or like cleaning implement, such as those disclosed in the above-noted patents to Forrest and Kammerer. The holder 52 can be mounted to the tool 10 so as to impart an oscillating or vibrating movement to the swab S as well as the platen 14. Such a configuration can further enhance the cleaning capabilities of the tool 10.

The platen may be sized to fit the inside diameter of the externally mounted cleaning pen. In this way, an accurate and non-invasive amount of cleaning solvent can be applied to the tape or swab tool. The tool tip can be recessed to accept either the platen or the swab tool.

All patents referred to herein, are hereby incorporated herein by reference, whether or not specifically done so within the text of this disclosure.

In the present disclosure, the words "a" or "an" are to be taken to include both the singular and the plural. Conversely, any reference to plural items shall, where appropriate, include the singular.

From the foregoing it will be observed that numerous modifications and variations can be effectuated without departing from the true spirit and scope of the novel concepts of the present disclosure. It is to be understood that no limitation with respect to the specific embodiments illustrated is intended or should be inferred. The disclosure is intended to cover by the appended claims all such modifications as fall within the scope of the claims.

What is claimed is:

1. A fiber optic component cleaning device comprising:
a body;
a motor mounted in the body;
a power supply mounted in the body and operably connected to the motor;
a resilient platen mounted to the body;
a cleaning material configured to reside on the platen; and
an oscillating device operably mounted to the motor to induce an oscillation in the body and the platen to oscillate the platen with the cleaning material thereon, wherein the oscillating device is an eccentric element mounted to the motor, wherein the motor rotates the eccentric element to oscillate the platen, and wherein the cleaning device is configured to clean surfaces of the fiber optic component by oscillating movement of the platen and the cleaning material on the platen.

2. The fiber optic component cleaning device of claim 1 wherein the device is configured to oscillate in a range of about 5,000 to 40,000 oscillations per minute.

3. The fiber optic component cleaning device of claim 1 wherein the cleaning material is an elongated strip.

4. The fiber optic component cleaning device of claim 3 including an advancing mechanism for advancing the cleaning material along the platen.

5. The fiber optic component cleaning device of claim 4 including feed and take-up spools for feeding fresh cleaning material and taking up used cleaning material.

6. The fiber optic component cleaning device of claim 5 wherein one or both of the feed and take up spools are configured for one-way movement.

7. The fiber optic component cleaning device of claim 1 wherein the power supply is a battery and wherein the battery is located in the body.

8. The fiber optic component cleaning device of claim 1 including a swab holder configured to secure a swab to the cleaning device.

9. The fiber optic component cleaning device of claim 8 wherein the swab holder is configured to oscillate the swab.

10. The fiber optic component cleaning device of claim 1 including a light mounted to the device.

11. The fiber optic component cleaning device of claim 10 wherein the light is an LED.

\* \* \* \* \*